(12) United States Patent
Lyon et al.

(10) Patent No.: US 7,900,225 B2
(45) Date of Patent: Mar. 1, 2011

(54) ASSOCIATION OF ADS WITH TAGGED AUDIOVISUAL CONTENT

(75) Inventors: Christopher Thomas Lyon, Kensington, CA (US); Gokul Rajaram, Los Altos, CA (US)

(73) Assignee: Google, Inc., Mountain View, CA (US)

( * ) Notice: Subject to any disclaimer, the term of this patent is extended or adjusted under 35 U.S.C. 154(b) by 260 days.

(21) Appl. No.: 11/676,940

(22) Filed: Feb. 20, 2007

(65) Prior Publication Data

US 2008/0201734 A1    Aug. 21, 2008

(51) Int. Cl.
*H04N 7/025* (2006.01)
*H04N 7/10* (2006.01)

(52) U.S. Cl. .................. 725/32; 725/34; 725/35; 725/36; 725/109; 725/110; 725/111

(58) Field of Classification Search .......... 725/32, 725/34–36, 109–111
See application file for complete search history.

(56) References Cited

U.S. PATENT DOCUMENTS

| | | | |
|---|---|---|---|
| 7,047,502 B2 * | 5/2006 | Petropoulos et al. | 715/781 |
| 7,668,821 B1 * | 2/2010 | Donsbach et al. | 707/765 |
| 2002/0042913 A1 * | 4/2002 | Ellis et al. | 725/34 |
| 2005/0256867 A1 | 11/2005 | Walther et al. | |
| 2006/0116196 A1 | 6/2006 | Vancura | |
| 2006/0218577 A1 * | 9/2006 | Goodman et al. | 725/32 |
| 2006/0287916 A1 * | 12/2006 | Starr et al. | 705/14 |
| 2007/0033269 A1 | 2/2007 | Atkinson et al. | |
| 2007/0043617 A1 * | 2/2007 | Stein et al. | 705/14 |
| 2007/0078706 A1 * | 4/2007 | Datta et al. | 705/14 |
| 2007/0124762 A1 * | 5/2007 | Chickering et al. | 725/35 |
| 2007/0129054 A1 * | 6/2007 | Andronikov et al. | 455/404.2 |
| 2007/0130015 A1 * | 6/2007 | Starr et al. | 705/14 |
| 2007/0192164 A1 * | 8/2007 | Nong et al. | 705/10 |
| 2007/0203747 A1 * | 8/2007 | Baharloo et al. | 705/2 |
| 2008/0034329 A1 * | 2/2008 | Posner et al. | 715/856 |
| 2008/0098450 A1 * | 4/2008 | Wu et al. | 725/132 |
| 2008/0109306 A1 * | 5/2008 | Maigret et al. | 705/14 |
| 2008/0126191 A1 * | 5/2008 | Schiavi | 705/14 |

FOREIGN PATENT DOCUMENTS

| | | |
|---|---|---|
| KR | 10-2001-0000710 | 1/2001 |
| WO | WO01/97726 | 2/2001 |

OTHER PUBLICATIONS

U.S. Appl. No. 11/096,234, filed Mar. 31, 2005, Baluja et al.

(Continued)

*Primary Examiner* — Christopher Kelley
*Assistant Examiner* — Mulugeta Mengesha
(74) *Attorney, Agent, or Firm* — Fish & Richardson P.C.

(57) ABSTRACT

Methods, systems, and apparatus, including computer program products, for presenting advertisements. In one aspect, audiovisual content is presented to a user. An indicator is presented together with the audiovisual content to the user. The indicator is associated with one or more tags. Input selecting the indicator is received from the user. An advertisement, associated with the indicator and dynamically selected based at least in part on one or more of the tags, is presented to the user.

21 Claims, 10 Drawing Sheets

OTHER PUBLICATIONS

V. Michael Bove, Jr. et al., "Adding Hyperlinks to Digital Television," Proc. SMPTE 140th Technical Conference, 1998, available at http://web.media.mit.edu/~vmb/papers/SMPTE98.ps.

T. Palpanas, "Arranging Pixels in a DBMS When Vision and Databases Come Together," Technical Report CSRG-404, Department of Computer Science, University of Toronto, Jan. 2000, available at http://dit.unitn.it/~themis/publications/visiondb.pdf.

R. Hose, "A Spatially Coherent Method for Multi Modal Image Segmentation," Bits on Our Minds 2005, Cornell University, available at http://www.cis.cornell.edu/boom/2005/ProjectArchive/multimodal/MMSeg_RH.pdf.

"Collabulary," printed Jun. 8, 2006, available at http://en.wikipedia.org/wiki/Collabulary.

"Controlled vocabulary," printed Jun. 8, 2006, available at http://en.wikipedia.org/wiki/Controlled_vocabularies.

"Flickr," printed Jun. 8, 2006, available at http://en.wikipedia.org/wiki/Flickr.

"ImageShack," printed on Jun. 8, 2006, available at http://en.wikipedia.org/wiki/ImageShack.

"TechCrunch," printed on Jun. 8, 2006, available at http://www.techcrunch.com/tag/Amazon.

International Search Report and Written Opinion of the International Searching Authority, PCT Serial No. PCT/US2008/054419, Jul. 28, 2008, 10 pages.

International Preliminary Report on Patentability for PCT Serial No. PCT/US2008/054419, dated Aug. 26, 2009, 5 pages.

* cited by examiner

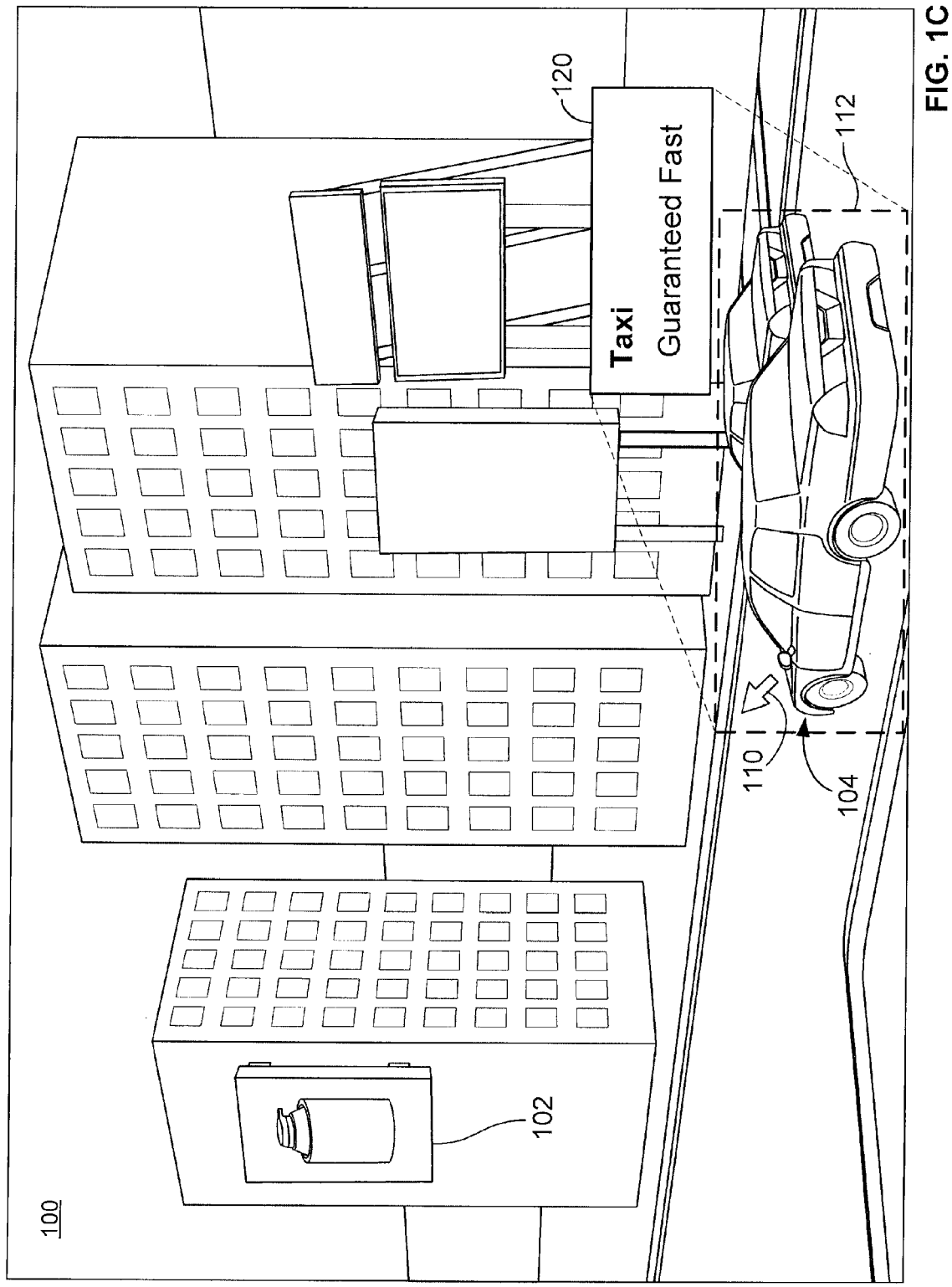

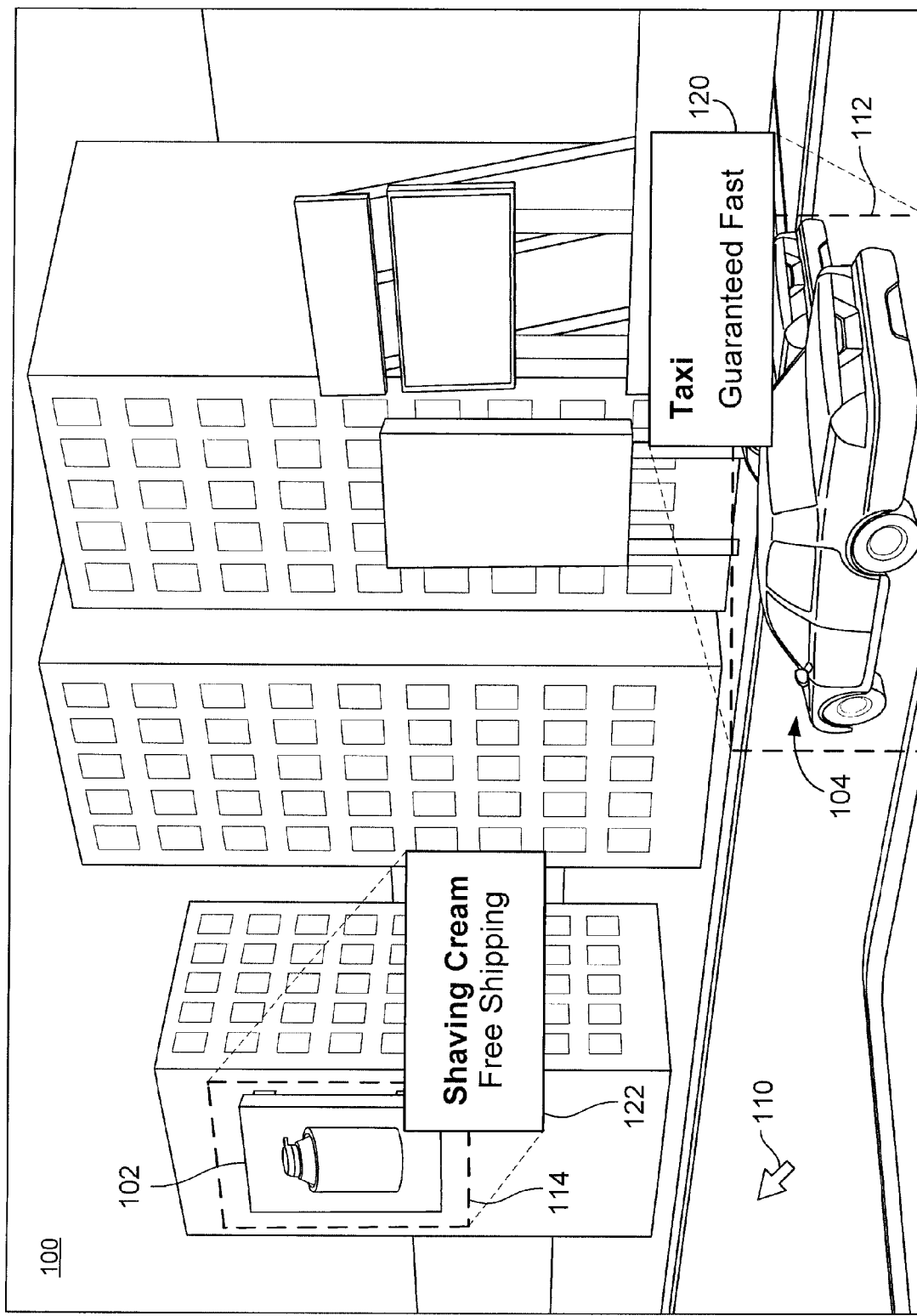

ASSOCIATION OF ADS WITH TAGGED AUDIOVISUAL CONTENT

BACKGROUND

The specification relates to advertising.

Online advertising is a widespread feature of many web pages. Advertisers prefer to place advertisements ("ads") on web pages which have content that is relevant to the ads. For example, ads for auto parts might be pertinent to web pages featuring auto repair techniques. Therefore, auto parts advertisers might prefer to place ads on web pages featuring auto repair techniques.

Online advertising can be a desirable feature of hosting services that provide for the sharing of audiovisual content, such as images, videos, or electronic games. As the main content of these hosting services is audiovisual, providing effective online advertising amounts to determining which ads are relevant to the audiovisual content, which in turn relies on determining the nature of the audiovisual content.

Typical approaches to determining the nature of audiovisual content include community "tagging," or allowing users in a broad community to associate textual key phrases ("tags") with audiovisual content as a whole. For example, an image of a Wankel rotary engine could be tagged, "Wankel rotary engine," "Wankel," and "engine." Similarly, an image of a basketball game could be tagged with the names of the teams playing or the names of all the players depicted in the image. However, community tagging of audiovisual content can be incomplete and inaccurate. Some content may not be tagged at all, while other content may be tagged with impertinent commentary, such as "cool" or "wow." The lack of tags or the presence of impertinent or irrelevant tags may make the determination of relevant ads difficult.

SUMMARY

In general, one aspect of the subject matter described in this specification can be embodied in methods that include the actions of presenting audiovisual content to a user, presenting an indicator together with the audiovisual content to the user, the indicator associated with one or more tags, receiving input from the user selecting the indicator, and presenting an advertisement associated with the indicator to the user, the advertisement having been dynamically selected based at least in part on one or more of the tags. Other embodiments of this aspect include corresponding systems, apparatus, computer program products, and computer readable media.

In general, another aspect of the subject matter described in this specification can be embodied in methods that include the actions of defining one or more regions to be associated with audiovisual content, defining one or more tags for each region, and associating the one or more tags with the respective regions. Other embodiments of this aspect include corresponding systems, apparatus, computer program products, and computer readable media.

In general, another aspect of the subject matter described in this specification can be embodied in methods that include the actions of receiving input from a first user to associate a tag with audiovisual content, presenting the audiovisual content to a second user, determining the relevance of an advertisement for the second user based at least in part on the tag, and presenting the advertisement to the second user. Other embodiments of this aspect include corresponding systems, apparatus, computer program products, and computer readable media.

BRIEF DESCRIPTION OF THE DRAWINGS

FIGS. 1A-1D illustrate variations of an exemplary user interface for viewing ads presented with audiovisual content.

Like reference numbers and designations in the various drawings indicate like elements.

DETAILED DESCRIPTION

FIGS. 1A-1D illustrate variations of an exemplary user interface for viewing ads presented along with audiovisual content. An advertisement (or "ad") includes content which can be of the form of any kind of content designed to promote a product, service, or brand, or to otherwise give public notice of some subject matter (e.g., public service announcements, political ads, want ads, online auctions, etc.). An ad may include text, graphics, audio, video, or any combination thereof. An ad can be dynamic or static, and can respond to user interaction, such as a mouse click or a mouse-over (also known as a mouse hover). An ad may be chosen dynamically by the system or remain statically fixed. Audiovisual content may include, for example, audio content, still images, animation, video, electronic games, or any combination thereof The audiovisual content may be implemented using any of a number of technologies, including but not limited to HTML, JPEG, GIF, MPEG, QUICKTIME by APPLE COMPUTER, INC., ADOBE FLASH, etc. In some implementations, the audiovisual content is presented in a web page rendered and displayed in a web browser.

Figure 1A:
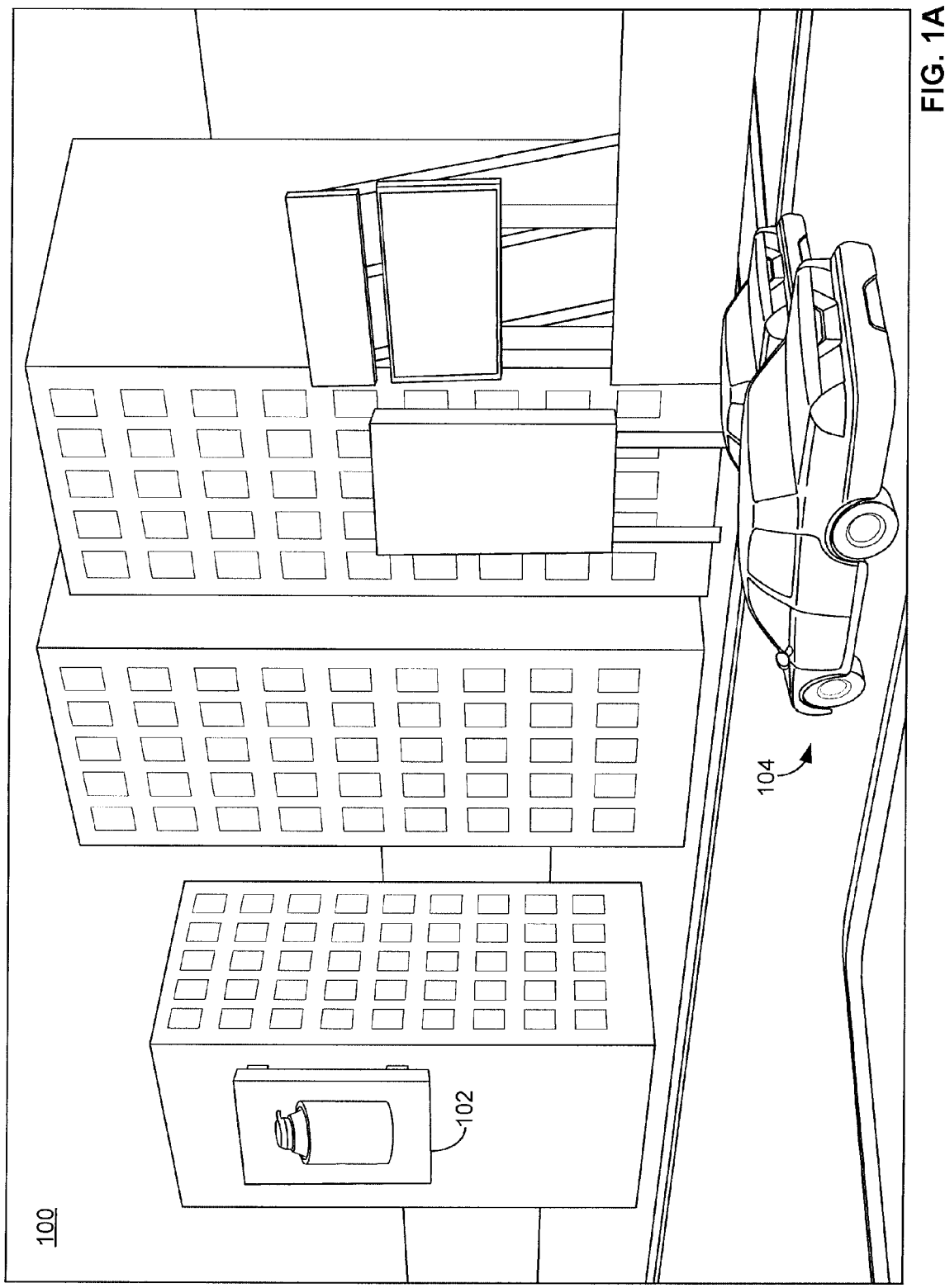
Figure 1B:
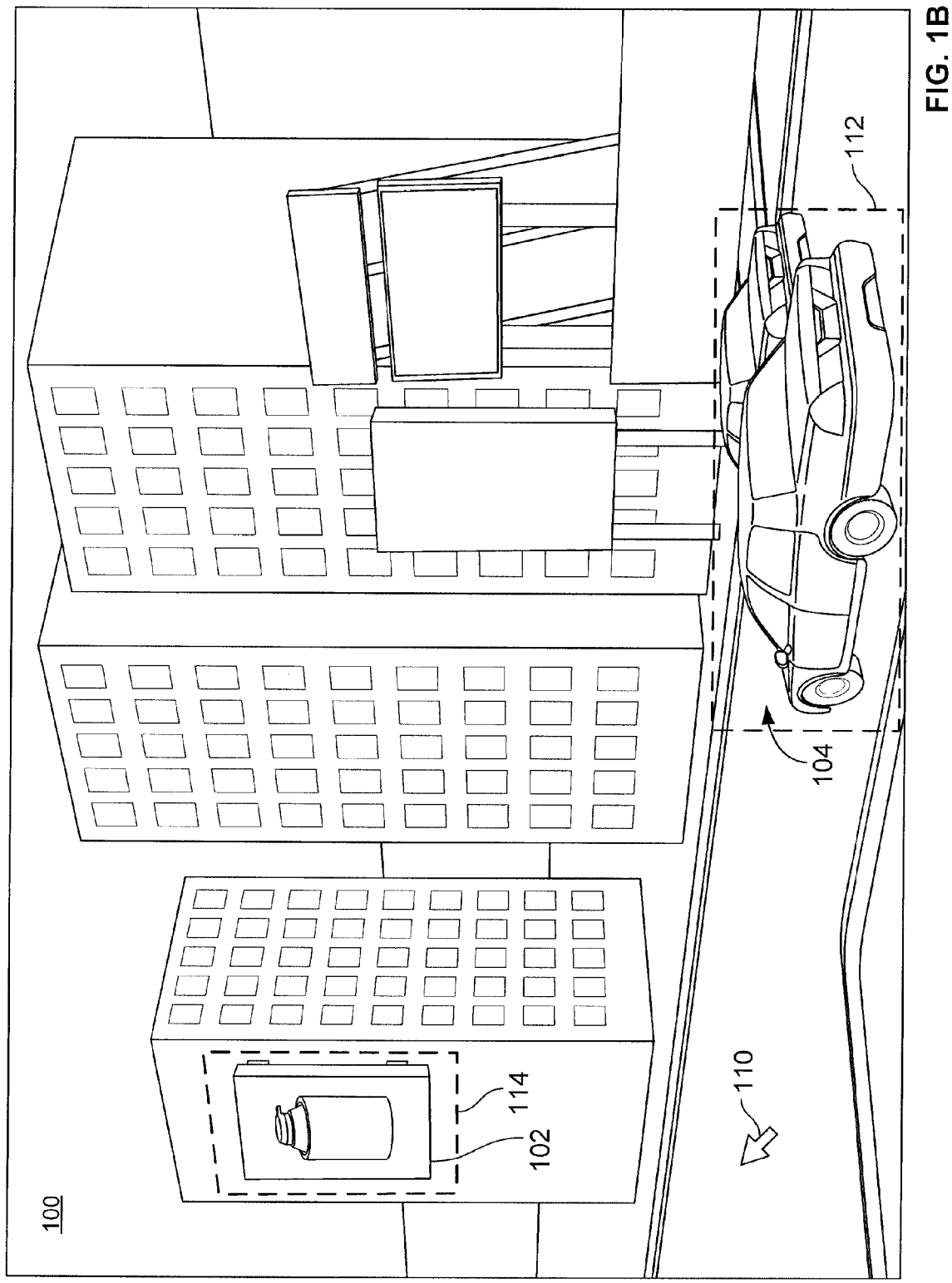

FIG. 1A illustrates a presentation of audiovisual content to a user. In the example in FIG. 1A, the audiovisual content is an image 100 depicting a city street and building along that street. Among the objects depicted by the image 100 are a billboard 102, mounted on a building, for shaving cream, and cars 104 moving on the street. A user may interact with the image 100 through user inputs, such as a mouse-over event. In response, a graphical user interface may present the audiovisual content with an indicator associated with a hotspot, as shown in FIG. 1B. As used in this specification, a hotspot is a portion of content (e.g., portion of the audiovisual content) which may be associated with additional content, such as advertisements. For example, a hotspot may be a particular region in an image defined by a particular object depicted in the image, as shown in FIGS. 1B-1D. In implementations where hotspots are regions within images or other visual content, the hotspots may be regularly shaped (e.g., a rectangle or circle) or irregularly shaped (e.g., following the contour of a feature in the audiovisual content). Hotspots may change size, shape, and location over time, for example to track a moving object in a video. As an example, in a video where a moving car defines the hotspot, as the car moves from one side of the screen to the other, the hotspot moves from one side to the other as well. In some implementations, hotspots may be indicated by outlines 112, in, for example, a contrasting color, or by shading. However, hotspots may be indicated in other ways, such as by a sound or feedback to a vibration-enabled input device when a mouse pointer hovers over a hotspot. In some implementations, a hotspot may be associated with one or more tags or labels, further details of which are described below.

In FIG. 1B, the mouse pointer 110 is positioned over the audiovisual content with indicators of hotspots. In some implementations, the hotspot indicators 112, 114 appear when the mouse pointer 110 hovers over any location in the image 100 away from the actual hotspots. In one exemplary implementation, the hotspot indicators 112, 114 appear when the mouse pointer 110 hovers over any location in the image 100, away from the actual hotspots, for at least a predetermined amount of time (e.g., 5 seconds). In some other implementations, a hotspot indicator does not appear until the mouse pointer 110 hovers over the corresponding hotspot.

An ad may be presented in response to a user input selecting a hotspot. In some implementations, a user input selecting a hotspot may include a mouse hover over the hotspot, a mouse click on the hotspot, receipt of a command and so forth. An ad 120 corresponding to the selected hotspot may be presented along with the audiovisual content of the image 100, as shown in FIG. 1C. The mouse cursor 110 is positioned over the hotspot, which indicates that it was a mouse-over event that caused the ad 120 to be presented.

In some other implementations, ads may be presented without requiring the mouse pointer 110 to hover over a hotspot. As shown in FIG. 1D, a user may hover the mouse pointer 110 over the image 100 in a location away from hotspots 112, 114. In response to the mouse hover, all hotspot indicators 112, 114 and ads 120, 122 in the image 100 are displayed. The audiovisual content with hotspot indicators 112, 114 and ads 120, 122 is displayed without waiting for a user to mouse-over a hotspot. In some implementations, the hotspots indicators and ads are shown immediately after the mouse pointer 110 is brought over the image 100. In some other implementations, the hotspot indicators and the ads are shown after the mouse pointer 110 hovers over the image 100 for at least a predetermined amount of time (e.g., 5 seconds). In FIG. 1D, the mouse cursor 110 is positioned over the audiovisual content with hotspots and ads shown in FIG. 1D, indicating that a mouse-over event caused the hotspot indicators and ads to be presented.

Hotspot indicators or hotspot indicators and ads may also be displayed as the result of other kinds of user input, such as keyboard commands, voice commands, hand gestures, mouse gestures, stylus gestures, stylus taps, cell phone keypad commands, touch screens, and selections utilizing a television remote control. The user interface can be provided in any kind of electronic device, such as a personal computer, a network computer, a dumb terminal, a mobile phone, an electronic game, a personal digital assistant, a portable media player, a videogame console, a portable videogame system, a digital camera, a television, a digital video recorder, a set-top box, or digital signage. In some implementations, the digital signage includes a touch-sensitive display.

Figure 2:
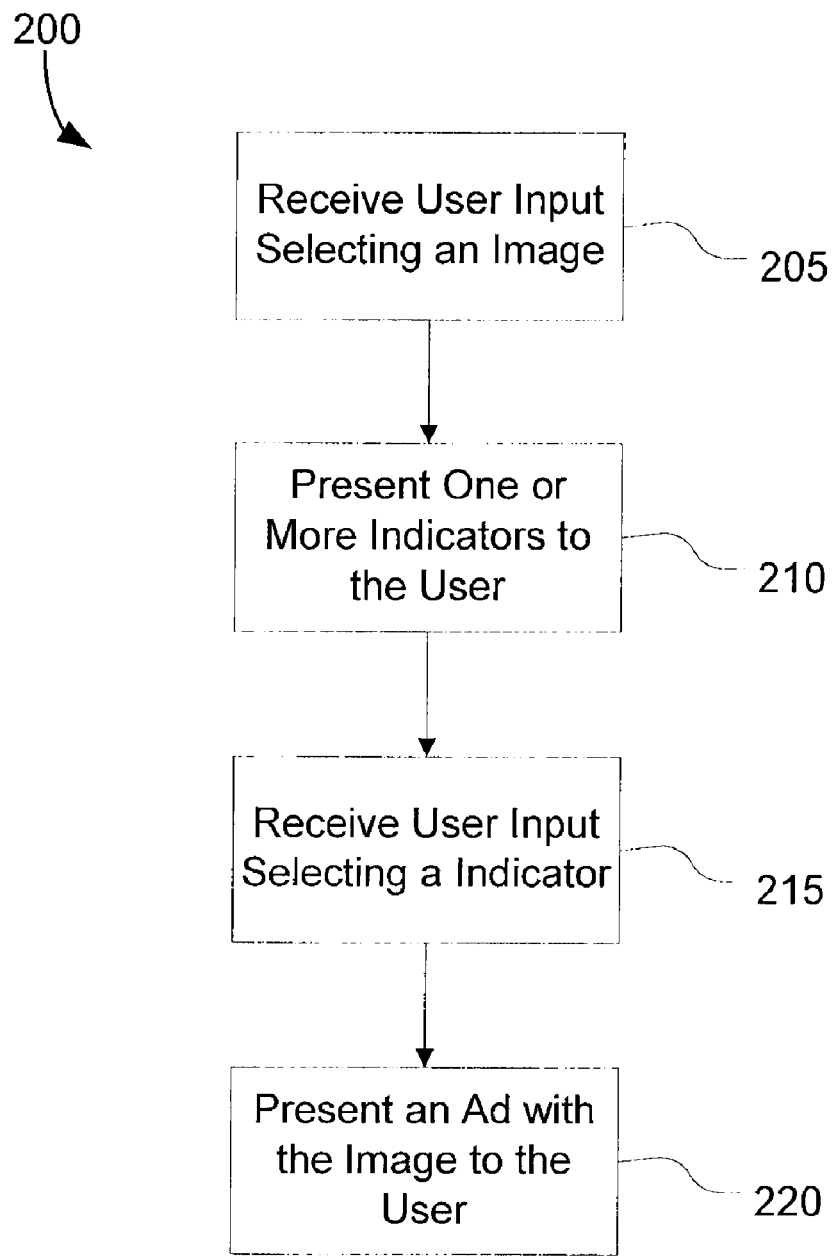
FIG. 2 illustrates an example process for presenting ads with audiovisual content.

FIG. 2 shows an example process flow 200 for presenting ads with audiovisual content. Audiovisual content may be presented to the user in any of a variety of devices and formats. In an exemplary implementation, the audiovisual content is presented in a web page displayed in a web browser at a computer. User input selecting the audiovisual content is received (205). For example, the user input may be a hover of a mouse pointer (e.g., mouse pointer 110 (FIG. 1B)) over audiovisual content. The audiovisual content may include one or more hotspots, regions, or portions that may be associated with additional content. Indicators of the hotspots, regions, or portions are presented to the user (210). The indicators (e.g., hotspot indicators 112, 114 (FIG. 1B)) may be presented to the user in a visually distinguishing manner, such as outlines in a contrasting color or shading with a lighter or darker tint.

In some implementations, the user is presented with indicators for all of the hotspots in the audiovisual content simultaneously. In some other implementations, the user is only presented with indicators for a subset of the hotspots at any one time. For example, the user may be presented with an indicator of the hotspot nearest to the mouse cursor. For example, in FIG. 1B, indicator 114 is closer to the mouse pointer 110 than indicator 112 and thus indicator 114 is presented to the user.

In some implementations, a hotspot may have no ad associated with it. Such a hotspot may appear defective to a user who expects to see advertisements, and thus the user may become confused. Therefore, a hotspot that is not associated with any ads may be hidden. A hotspot may be hidden by not displaying its indicator in response to any user input.

User input selecting a hotspot is received (215). In some implementations, a hotspot may be selected using the same type of user input as that used to select the audiovisual content. For example, if audiovisual content had been selected by hovering the mouse pointer over the content, an indicated hotspot may also be selected by hovering the mouse pointer over the content. For example, in FIG. 1C, hotspot 112 is selected by hovering the mouse pointer 110 over the area enclosed by the hotspot indicator 112. In some other implementations, a different manner of user input, such as a mouse click or mouse gesture, may be used to select the hotspot.

At least one ad associated with the selected hotspot is presented to the user (220). In some implementations, the ad is presented either over the audiovisual content or in proximity to the audiovisual content. For example, in FIG. 1C, the ad 120 associated with the selected hotspot 112 is displayed near the hotspot 112. In some implementations, if multiple advertisements are associated with the hotspot, the multiple advertisements or a subset thereof may be displayed simultaneously. In some other implementations, one of multiple advertisements associated with the hotspot may be displayed to one set of users and another one of the multiple advertisements may be displayed to another set of users. For example, for the hotspot 112 in FIG. 1B, an advertisement for a taxi company in New York city may be shown to some users and an advertisement for a taxi company in Los Angeles may be shown to other users. More generally, the advertisement that is shown may be based on location targeting, context targeting, or user history tracking.

In some implementations, the ad or ads that are presented may be selected based on one or more tags associated with the selected hotspot. For example, if the hotspot is associated with a tag "cars," one or more ads relevant to the tag "cars," such as ads for cars, auto parts merchants, auto rental services, or ground transportation services, may be presented.

Figure 3:
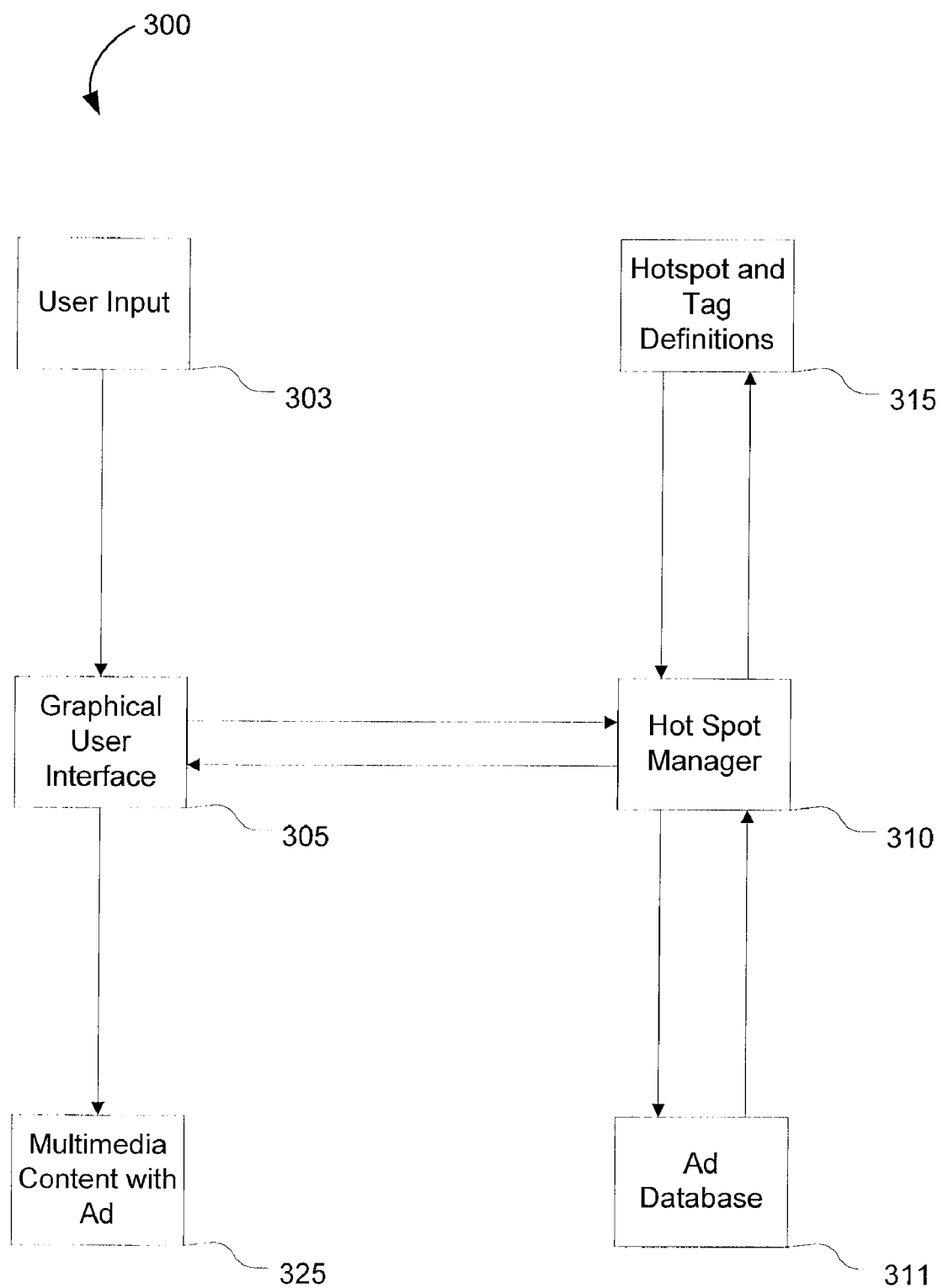
FIG. 3 illustrates an exemplary advertising system for presenting ads with audiovisual content.

FIG. 3 illustrates an advertising system for presenting ads with audiovisual content.

In the advertising system 300, a user supplies user input 303 by using an input device, such as a mouse, to interact with audiovisual content presented by a graphical user interface (GUI) 305. In some implementations, the GUI 305 may be implemented using Hypertext Markup Language (HTML), synchronous JavaScript and XML (AJAX), JavaScript, VBScript, or another client-side scripting language in a web browser. In some other implementations, the GUI may be provided by an application such as a word processor, a spreadsheet, a calendar, or any other type of application. In further implementations, the GUI may be implemented by an electronic game whereby hotspots are associated with visual objects in a virtual environment.

In a JavaScript implementation, user input (e.g., mouse or keyboard input) can be received as JavaScript events, for example mouseover, mouseout, mousemove, click, mouseup, and mousedown events. The GUI 305 can analyze user events to infer user intent. For example, the advertising system 300 can determine that quickly moving a mouse cursor over an image is not intended to select the image, but allowing the mouse cursor to linger over an image is intended to select the image. The advertising system can also determine gestures made from the user input, such as circles and strokes, to infer user intent.

The GUI 305 communicates with a hotspot manager 310 to determine hotspots to display. The hotspot manager 310 has access to hotspot and tag definitions 315, which allow the hotspot manager 310 to inform the GUI 305 of hotspot sizes, shapes, and locations. The GUI 305 is then able to determine whether the user has selected a hotspot. In some implementations, the hotspot manager 310 may be implemented as one or more remote servers in a data center.

In some other implementations, the hotspot and tag definitions may be received contemporaneously with a web page that includes the multimedia content or links to such embedded within. In this alternative implementation, the hotspot manager 310 need not be consulted to determine whether a hotspot has been selected. In one implementation, advertisements associated with the hotspots may also be received contemporaneously with the web page and the hotspot and tag definitions, allowing the advertisements for the hotspots to be displayed while the web page is accessed offline.

Once the GUI 305 has recognized that a hotspot has been selected, it again consults with the hotspot manager 310 to determine an ad to be presented to the user. The hotspot manager 310 communicates relevancy information to an ad database 311. The ad database 311 determines which ad would be most relevant to the user and communicates this choice of ad to the user. In some implementations, the most relevant ad is determined by automatically recognizing the object associated with the hotspot and finding the ad or ads that are most relevant to the recognized object. In implementations where hotspots may be associated with tags or labels, the most relevant ad may be determined by finding an ad or ads that are associated with the tag or label associated with the hotspot. The hotspot manager sends the ad(s) to the GUI 305, and then the GUI 305 presents the multimedia content with the ad 325 to the user.

The relevancy information may include any information regarding the content of the hotspot. The relevancy information may include "tags" associated with the hotspots, stored in the hotspot manager's 310 hotspot and tag definitions 315. Tags may be textual keywords or phrases which describe or are associated with the portions of the audiovisual content delineated by the hotspots. For example, if the hotspot and tag definition includes tags for image 100, it may include a tag "taxis" for hotspot 112 and "shaving" for hotspot 114, reflecting the fact that one hotspot covers a pair of taxis 104 and another hotspot covers a billboard 102 for shaving cream. Thus, a user who selects the "taxis" hotspot would be presented particular kinds of relevant ads, such as those promoting a taxi service (such as ad 120 (FIGS. 1C-1D)). In some other implementations, the relevancy information may also include a name or identifier associated with the hotspot (e.g., name of the hotspot, identifier of a source of the tag, date of tag, etc.). Other types of relevancy information may include information regarding the popularity of hotspots with respect to the number of click-throughs or selections by users.

In some implementations, an ad may be directly associated with a hotspot, so that the same ad is always displayed for a given hotspot. In such a case, tags and other relevancy information may be omitted for the particular hotspot.

The GUI 305, hotspot manager 310, and ad database 311 may be implemented on any number of computers, for example, from all being on the same computer to being implemented on server farms spread across a wide area network.

Figure 4A:
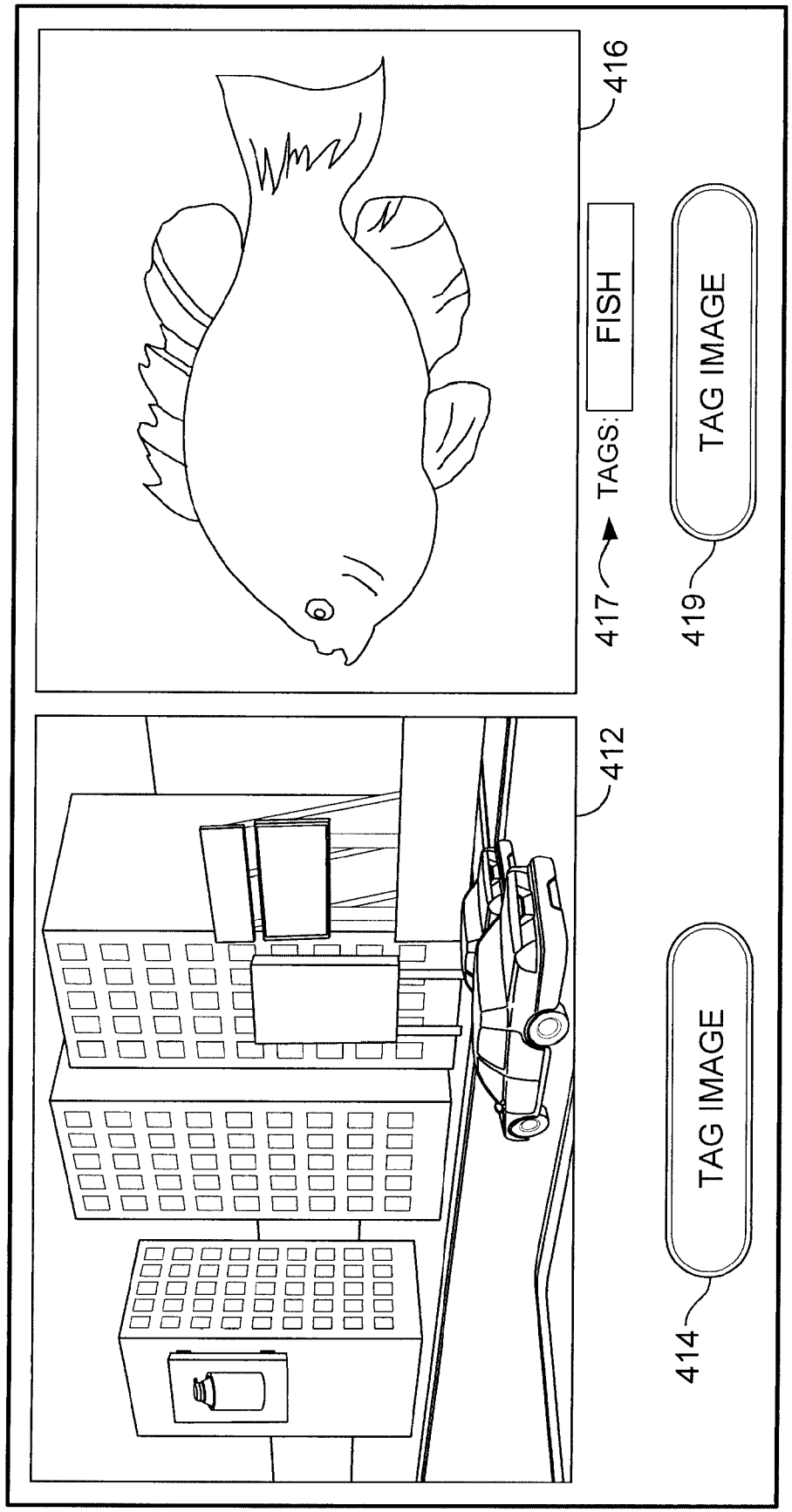
FIGS. 4A-4B illustrate an exemplary user interface for tagging audiovisual hotspots.
Figure 4B:
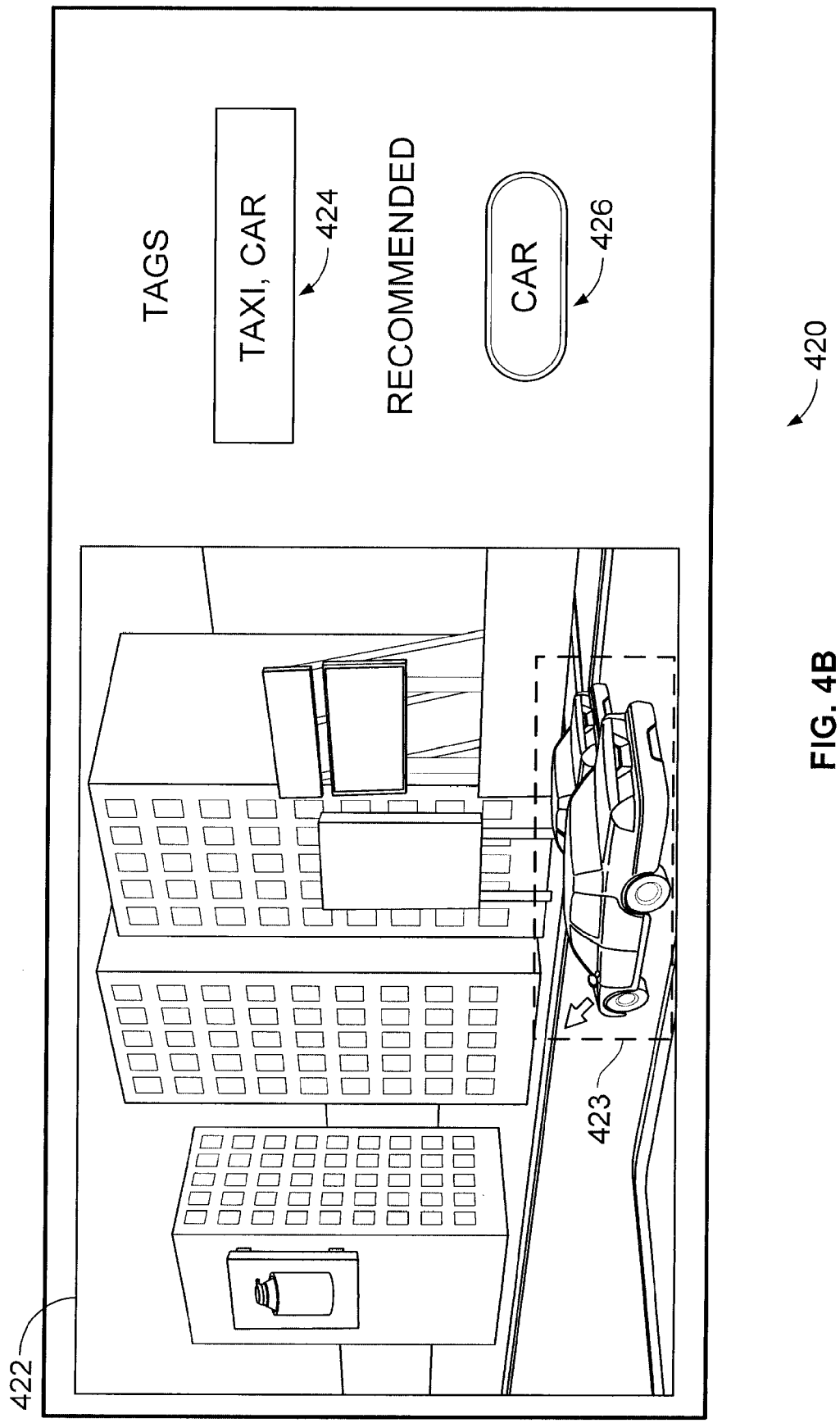

FIGS. 4A-4B illustrate a user interface for tagging audiovisual hotspots. In some implementations, an "image list" screen 418 shows several images, illustrated in FIG. 4A. Some images may have already been tagged and others may have yet to be tagged. The example image list screen 418 includes an image 412 of a city street and an image 416 of a fish. The city street image 412 has yet to be tagged, and the fish image 416 has already been tagged with the tag "fish." The image list screen 418 shown in FIG. 4A includes a "tag image" button 414 under the city street image 412. Under the fish image 416, there may be presented a list of one or more tags 417 (e.g., "fish") as well as a tag image button 419. Pressing either tag image button 414, 419 may trigger the display of a "tag image" screen 420, illustrated in FIG. 4B. The image, in this case the city street image 422, may be presented to the user, allowing the user to define a hotspot 423. The user may then define a tag for the hotspot by typing the tag information into a tag list 424 or pressing "recommended tag" buttons 426. The tag list 424 may also show tags already defined for the hotspot. The tag list 424 may differentiate between defined tags and tags being added by any number of ways, such as color coding or making one or the other bold. Each of the one or more recommended tag buttons 426 represents a tag that is suggested by the system. The user may press a respective recommended tag button 426 to add the corresponding tag to the image. In some implementations, the suggested tags may be derived from how other users have tagged the same image or tagged similar images, from which search terms include the image as a result, or from automatic image analysis or automatic object recognition. That is, in some implementations a tag may be suggested by the system if a number of users use the same tag for the same or similar image, or if an object corresponding to the tag is detected in the image.

In some other implementations, other types of content, such as videos, may be listed for users to define hotspots and add tags. A screen listing videos for tagging may display representative frames from the videos. In one implementation, images and videos may be included in the same list.

In some implementations, it is possible to restrict the tags which can be entered. For example, the number of tags a user can enter may be limited. As another example, the actual content of the tags may be controlled. In one exemplary implementation, tags can be restricted to those that are included in a "white list." A white list is a list of permissible tags, or more generally, a description of what tags that are permissible. For example, a white list of tags for a web site containing sports photos might include names of team names, names of athletes, and sports terminology, but exclude impertinent tags such as "wow" or "cool." In another exemplary implementation, particular tags may be excluded by a "black list," which is a list of impermissible tags, or more generally, a description of what tags are impermissible. Examples of black listed tags might include abusive epithets and profanity, or words commonly associated with spam, such as "Viagra" and "poker."

Figure 5:
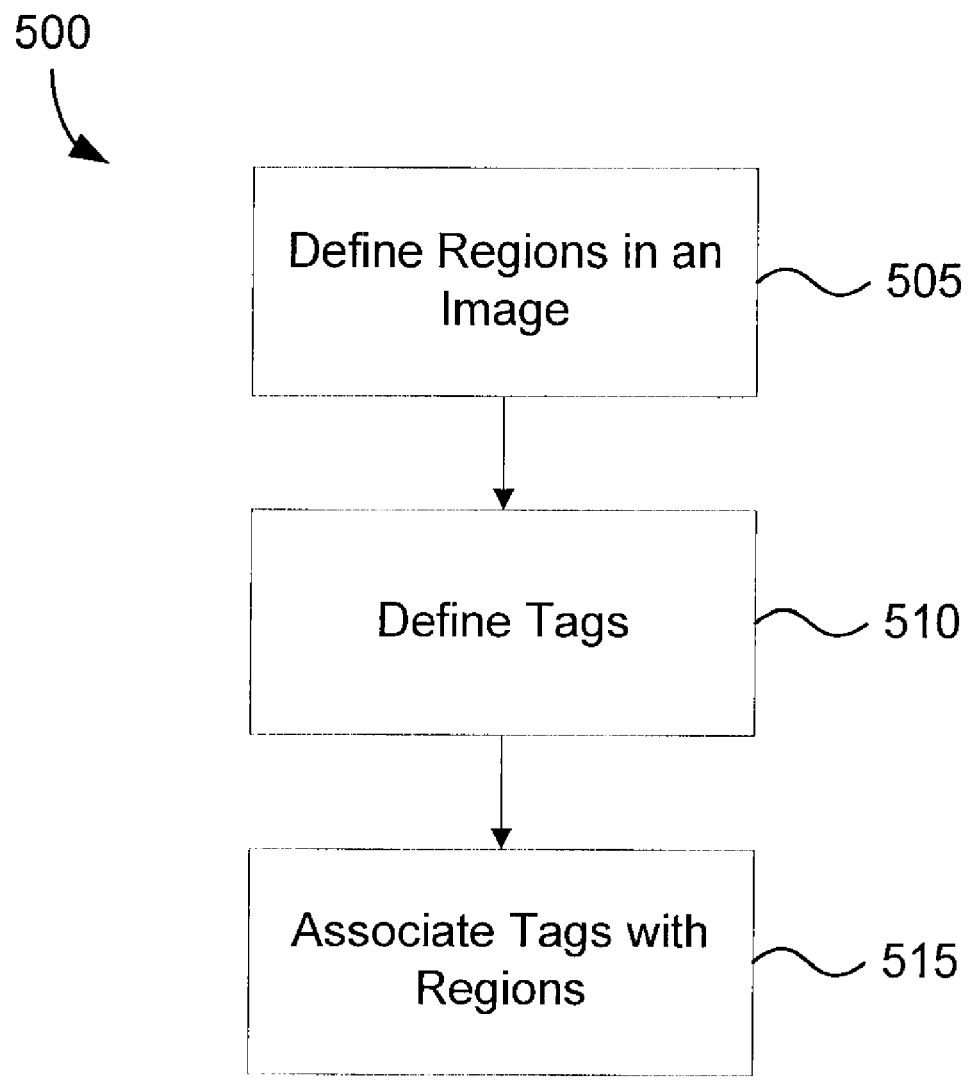
FIG. 5 illustrates an example process for tagging audiovisual hotspots.

FIG. 5 illustrates an example process flow 500 for tagging content.

One or more regions or portions in an item of content are defined (505). In some implementations, the regions are defined manually, based on user input. For example, a user may enclose the desired region in a polygonal or round selection tool, such as a lasso. In some other implementations, the user may select a region, and automatic object recognition or image analysis techniques may be used to detect objects in the selected region and define those objects as hotspot regions. For example, a user may stroke over the rough shape of an object, and coherent classification techniques can determine the object's shape more precisely. The coherent classification techniques can be based, broadly speaking, on color or texture. Specific coherent classification techniques include energy minimization, such as that described in Ron Hose, "A Spatially Coherent Method for Multi-Modal Image Segmentation," *Bits on Our Minds* 2005, *Cornell University*, March 2005. Coherent classification can be especially effective when defining hotspots in video. Image tracking can be used to adapt a hotspot to subsequent frames in video, changing size, shape, or location as necessary to follow moving objects.

In further implementations, the defining of regions may be entirely based on automatic object recognition, image analysis, or other automated processes, without user selection of particular regions of content.

One or more tags are defined (510). In some implementations, the tags are received from the user. For example, the user may manually type in one or more tags. As another example, the user may choose one or more tags from a list of suggested tags. The list of suggested tags may be populated with suggestions based on tags other users have used for the content, on search terms that include the content as a result, and/or based on automatic object recognition or image analysis. In some other implementations, the tags may be defined automatically. For example, objects detected during automatic object recognition or image analysis can be defined as tags.

The one or more tags are associated with the one or more regions (515). In some implementations, the associations may be made based on user input. For example, the user may define a region and then define tags for that region. As another example, the user may define several regions, and then select a region in order to define a tag for the selected region. In some other implementations, the associations are automatically made. For example, an object that is recognized based on automatic object recognition may be associated with a tag representing the name of the object. More generally, the regions may be tagged using automated processes.

Figure 6:
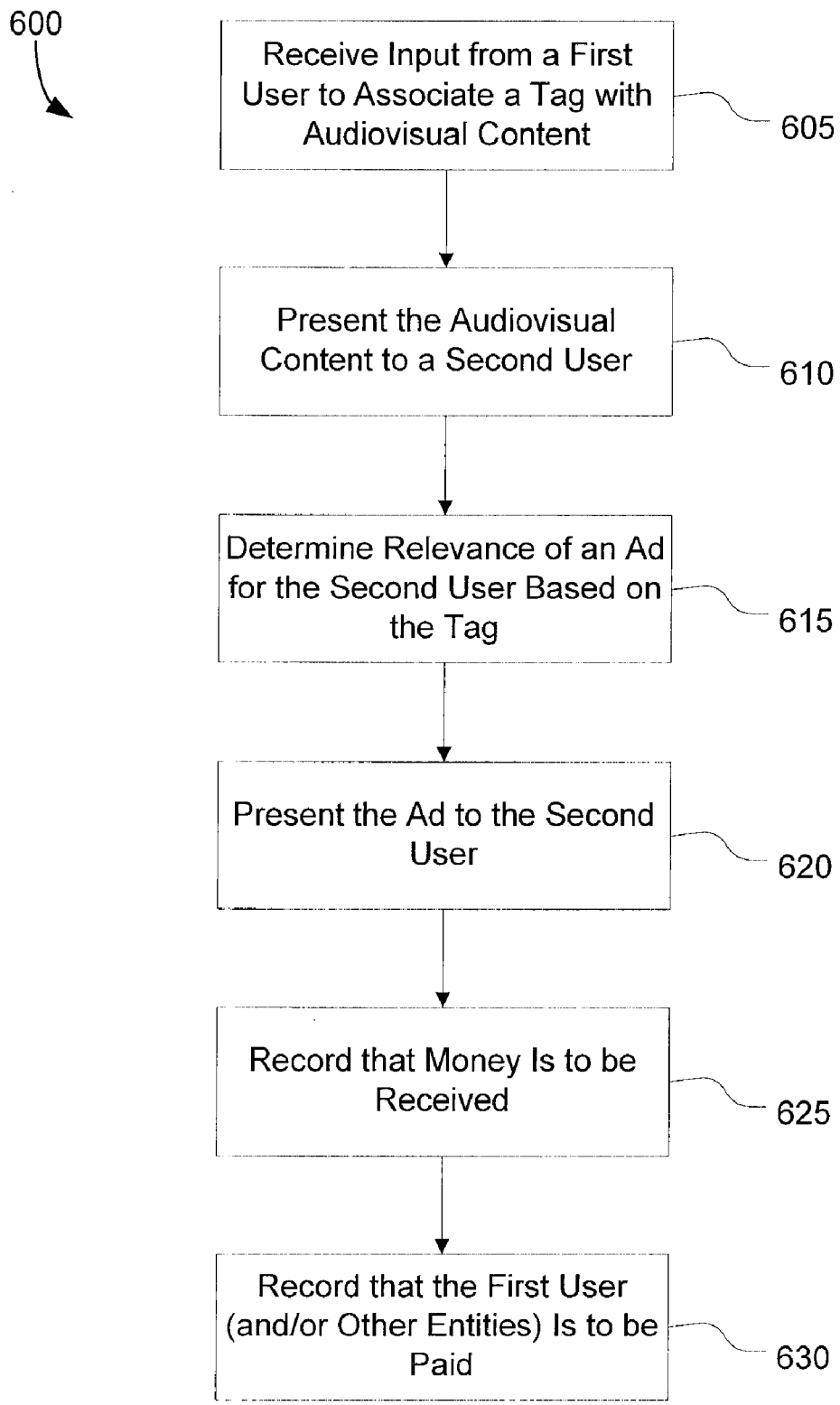
FIG. 6 illustrates an example process for bookkeeping regarding ads presented with audiovisual content.

FIG. 6 illustrates an example process flow 600 for bookkeeping regarding ads presented with audiovisual content.

Input is received from a first user to associate a tag with a region in some content (605). In some implementations, process flow 500 may be used to associate the tag with a hotspot. For sake of illustration, the audiovisual content may be a photograph of a basketball team, and hotspots may be defined overlaying each player on the team. The audiovisual content is presented to a second user (610). For example, the second user may navigate to a web page containing the basketball team picture described above. The web page and the picture is rendered in a web browser for display to the second user.

The second user, having been presented with the audiovisual content, selects a region (e.g., a hotspot) in the content. The relevance of an ad for the second user is determined based in part on the tag defined by the first user for the selected region (615). The ad is presented to the second user (620). For example, the ad may be presented in accordance with the process described in reference to FIG. 2. In some implementations, the ad is presented to the second user if the ad is determined to be relevant. If the ad is determined not to be relevant, another ad may be presented.

In some implementations, the advertising system records that payment is to be received (625). In one exemplary implementation, money is to be received from the advertiser who placed the advertisement that was presented to the second user. For example, an operator of an advertising system may contract with advertisers on a pay-per-impression or pay-per-click basis. Pay-per-impression generally refers to a transaction between advertiser and an ad sponsor that the sponsor charges each time the ad is shown to users. If, for example, the ad is shown 1,000 times, the sponsor will charge for 1,000 impressions no matter how many times a user actually responds to the ad by selecting the ad. Pay-per-click generally refers to a transaction where the sponsor charges only when a user who is presented with an ad responds to the ad by selecting the ad. If out of the 1,000 impressions, only 42 resulted in users clicking the ad, the sponsor would charge for 42 clicks. The sponsor can invoice advertisers on a regular basis, for example monthly or quarterly, to collect what is owed.

The payments due may or may not be immediately recorded in an accounting journal or ledger, or more generally any data structure suitable for recording payments data. It is possible to accumulate payments due for a period of time (e.g., a day or a week) before journalizing a transaction or posting a transaction (e.g., to an accounting ledger or database). In such a situation the payments due are still made of record.

The payments need not be paid in freely convertible currency; the payments can also be made in scrip, tokens, vouchers, gift certificates, prepaid cards, barter, credit, or other forms of payment including the electronic equivalents thereof. Payments can also be made in barter, meaning anything of value including goods and services.

The advertising system records that payment is due to the first user (630). This payment due can be a set fraction of the credit recorded from the second user. Payments may be sent on a regular basis, e.g., monthly or quarterly, to pay the money the sponsor owes the first user. The same caveats about "debit," "credit," and "payment" may apply here as well.

In some implementations, when multiple first users tag the same audiovisual content, a question may arise as to which of the first users should receive payment. For example, an image hosting site may allow many users to tag the same image, resulting in a rich and diverse set of tags for that image. Suppose a pay-per-impression ad is displayed based on one of the tags. Payment is recorded as being due to the "first" users who applied that tag to the image, but the question is which of these "first" users should be paid. The advertising system may resolve the question in one of several ways. Users may be prohibited from entering tags already entered above a specified a maximum number of times. (So, for instance, an image could be tagged a maximum of 10 times with the same tag.) The pay may be split equally among a small number of users. Alternatively, the advertising system may give progressively lower and lower payments to users who apply a redundant tag to an image. For example, the chronologically first user to tag the image could receive 10% of the payment the advertising system receives for using that tag to display an image. Another user who applies the same tag could receive 5% of the payment, and yet another user 2.5%, etc.

In some implementations, the host of the audiovisual content, and perhaps other entities, may be paid as well. For example, the website that hosted the audiovisual content may split the payment with the first user.

It should be appreciated that the payment arrangements described above are merely exemplary. Alternative arrangements may be implemented. For example, it may be the case that the first user and the host of the audiovisual content, and perhaps additional entities, may split the proceeds generated by the content, as described above. As another example, all of the proceeds generated by the content may be paid to the host of the content (for instance, in a situation where content are tagged entirely by automated processes).

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. Implementations of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

The subject matter of this specification has been described in terms of particular implementations, but other implementations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing can be advantageous. Other variations are within the scope of the following claims.

What is claimed is:

1. A computer-implemented method, comprising:
   receiving a first user input from a first user to define a first region over audiovisual content;
   selecting a suggested tag, the suggested tag being based on a tag used by a second user, the suggested tag being a textual key word or phrase that describes or is associated with a second region of different audiovisual content, where the second region is similar to the first region;
   presenting the suggested tag to the first user, the suggested tag to be associated with the first region and used for selection of advertisements to display over the audiovisual content in response to other users selecting the first region;
   receiving a second user input from the first user, the second user input selecting the suggested tag to associate with the first region; and
   in response to the second user input, associating the suggested tag with the first region.

2. The method of claim 1, wherein the audiovisual content is an image or a video.

3. The method of claim 2, further comprising:
   presenting the first user with a second suggested tag based on image analysis of the image or the video.

4. The method of claim 2, further comprising:
   presenting the first user with a suggested region based on image analysis of the image or the video.

5. A computer-implemented method, comprising:
   receiving first inputs from a plurality of first users to associate a tag with audiovisual content;
   presenting the audiovisual content to a second user;
   determining relevance of an advertisement for the second user based at least in part on the tag;
   presenting the advertisement to the second user; and
   recording that an item of value is to be received by each of the plurality of first users in exchange for presenting the advertisement to the second user, wherein the item of value reflects progressively lower payments to the plurality of first users based on an order that the input from each of the plurality of first users is received.

6. The method of claim 5, further comprising:
   receiving a second input from the second user selecting the advertisement.

7. A system, comprising:
   one or more processors; and
   one or more sets of instructions configured for execution by the one or more processors, the one or more sets of instructions comprising instructions:
   to receive a first user input from a first user to define a region over audiovisual content;
   to select a suggested tag, the suggested tag being based on a tag used by a second user, the suggested tag being a textual key word or phrase that describes or is associated with a second region of different audiovisual content, where the second region is similar to the first region;
   to present the suggested tag to the first user, the suggested tag to be associated with the first region and used for selection of advertisements to display over the audiovisual content in response to other users selecting the first region;
   to receive a second user input from the first user, the second user input selecting the suggested tag to associate with the first region; and
   to associate the suggested tag with the first region in response to the second user input.

8. A computer-readable storage device having stored thereon instructions, which, when executed by a processor, cause the processor to perform operations comprising:
   receiving a first user input from a first user to define a region over audiovisual content;
   selecting a suggested tag, the suggested tag being based on a tag used by a second user, the suggested tag being a textual key word or phrase that describes or is associated with a second region of different audiovisual content, where the second region is similar to the first region;
   presenting the suggested tag to the first user, the suggested tag to be associated with the first region and used for selection of advertisements to display over the audiovisual content in response to other users selecting the first region;
   receiving a second user input from the first user selecting the suggested tag to associate with the first region; and
   in response to the second user input, associating the suggested tag with the first region.

9. A system, comprising:
   one or more processors; and
   one or more sets of instructions configured for execution by the one or more processors, the one or more sets of instructions comprising instructions:
   to receive first inputs from a plurality of first users to associate a tag with audiovisual content;
   to present the audiovisual content to a second user;
   to determine relevance of an advertisement for the second user based at least in part on the tag;
   to present the advertisement to the second user; and
   to record that an item of value is to be received by each of the plurality of first users in exchange for presenting the advertisement to the second user, wherein the item of value reflects progressively lower payments to the plurality of first users based on an order that the input from each of the plurality of first users is received.

10. A computer-readable storage device having stored thereon instructions, which, when executed by a processor, causes the processor to perform operations comprising:
    receiving first inputs from a first plurality of first users to associate a tag with audiovisual content;
    presenting the audiovisual content to a second user;
    determining relevance of an advertisement for the second user based at least in part on the tag;
    presenting the advertisement to the second user; and
    recording that an item of value is to be received by each of the plurality of first users in exchange for presenting the advertisement to the second user, wherein the item of value reflects progressively lower payments to the plurality of first users based on an order that the input from each of the plurality of first users is received.

11. The method of claim 1, further comprising:
presenting an indicator together with the audiovisual content to a third user, the indicator designating the first region of the audiovisual content;
receiving a third user input from the third user selecting the indicator;
in response to the third user's input selecting the indicator, presenting, over the audiovisual content, an advertisement associated with the indicator to the third user, the advertisement having been dynamically selected based at least in part on the suggested tag.

12. The system of claim 7, the one or more sets of instructions further comprising instructions:
to present an indicator together with the audiovisual content to a third user, the indicator designating the first region of the audiovisual content;
to receive a third user input from the third user selecting the indicator;
in response to the third user's input selecting the indicator, present, over the audiovisual content, an advertisement associated with the indicator to the third user, the advertisement having been dynamically selected based at least in part on the suggested tag.

13. The system of claim 7, wherein the audiovisual content is an image or a video.

14. The system of claim 7, the one or more sets of instructions further comprising instructions:
to present the first user with a second suggested tag based on image analysis of the image or the video.

15. The system of claim 7, the one or more sets of instructions further comprising instructions:
to present the first user with a suggested region based on image analysis of the image or the video.

16. The computer readable storage device of claim 8, the operations further comprising:
presenting an indicator together with the audiovisual content to a third user, the indicator designating the first region of the audiovisual content;
receiving a third user input from the third user selecting the indicator;
in response to the third user's input selecting the indicator, presenting, over the audiovisual content, an advertisement associated with the indicator to the third user, the advertisement having been dynamically selected based at least in part on the suggested tag.

17. The computer readable storage device of claim 8, wherein the audiovisual content is an image or a video.

18. The computer readable storage device of claim 8, the operations further comprising:
presenting the first user with a second suggested tag based on image analysis of the image or the video.

19. The computer readable storage device of claim 8, the operations further comprising:
presenting the first user with a suggested region based on image analysis of the image or the video.

20. The system of claim 9, the one or more sets of instructions further comprising instructions:
to receive a second input from the second user selecting the advertisement.

21. The computer storage device of claim 10, the operations further comprising:
receiving a second input from the second user selecting the advertisement.

* * * * *

UNITED STATES PATENT AND TRADEMARK OFFICE
CERTIFICATE OF CORRECTION

| | |
|---|---|
| PATENT NO. | : 7,900,225 B2 |
| APPLICATION NO. | : 11/676940 |
| DATED | : March 1, 2011 |
| INVENTOR(S) | : Lyon et al. |

It is certified that error appears in the above-identified patent and that said Letters Patent is hereby corrected as shown below:

Column 12, line 58, in claim 10, delete "causes" and insert --cause--.

Signed and Sealed this

Third Day of May, 2011

David J. Kappos
*Director of the United States Patent and Trademark Office*